United States Patent [19]

Rando

[11] Patent Number: 5,329,103
[45] Date of Patent: Jul. 12, 1994

[54] LASER BEAM SCANNER WITH LOW COST DITHERER MECHANISM

[75] Inventor: Joseph F. Rando, Los Altos, Calif.

[73] Assignee: Spectra-Physics, San Jose, Calif.

[21] Appl. No.: 784,771

[22] Filed: Oct. 30, 1991

[51] Int. Cl.⁵ .................... G02B 26/08; G06K 7/01; G06K 7/10

[52] U.S. Cl. .................... 235/462; 235/470; 235/467; 359/201; 359/204; 359/223; 359/224

[58] Field of Search ............... 235/462, 467, 470, 472; 359/201, 202, 223, 224

[56] References Cited

U.S. PATENT DOCUMENTS

| | | |
|---|---|---|
| 3,758,199 | 9/1973 | Thaxter .................... 359/224 |
| 4,230,393 | 10/1980 | Burke, Jr. .................... 359/224 X |
| 4,394,645 | 7/1983 | Humble et al. . |
| 4,676,343 | 6/1987 | Humble et al. . |
| 4,732,440 | 3/1988 | Gadhok . |
| 4,766,296 | 8/1988 | Barth . |
| 4,792,018 | 12/1988 | Humble et al. . |
| 4,825,045 | 4/1989 | Humble . |
| 4,833,308 | 5/1989 | Humble . |
| 4,861,125 | 8/1989 | Vaught . |
| 4,902,083 | 2/1990 | Wells . |
| 4,929,819 | 5/1990 | Collins . |
| 4,939,355 | 7/1990 | Rando . |
| 4,940,116 | 7/1990 | O'Conner et al. . |
| 4,959,530 | 9/1990 | O'Conner . |
| 4,960,985 | 10/1990 | Knowles .................... 235/467 |
| 4,964,053 | 10/1990 | Humble . |
| 5,003,300 | 3/1991 | Wells . |
| 5,099,110 | 3/1992 | Shepard et al. .................... 235/467 X |
| 5,170,277 | 12/1992 | Bard et al. .................... 235/462 X |

FOREIGN PATENT DOCUMENTS

| | | | |
|---|---|---|---|
| 458800 | 3/1975 | U.S.S.R. .................... | 359/223 |
| 598099 | 3/1978 | U.S.S.R. .................... | 359/223 |

Primary Examiner—Constantine Hannaher
Assistant Examiner—Edward J. Glick
Attorney, Agent, or Firm—Lyon & Lyon

[57] ABSTRACT

Two resonant cantilever beams oscillate in a sinusoidal pattern. Mirrors disposed on the oscillating ends of the cantilever beams are used to multiplex two scanning and collecting light beams. The cantilever beam parameters and mirror configuration are selected so that the scanning light beam is on the first mirror during the linear portion of its scan. As the first cantilever beam oscillates out of the linear portion of the sine wave, the deflection of the first mirror is just great enough to allow the scanning beam to strike the second mirror during the linear portion of the second mirror's scan. The process is repeated twice each cycle. The collection lens is large enough to receive the full aperture of both mirrors at all times. Multiplexing of scanning diodes is also accomplished by a controller circuit which alternately enables diodes disposed on the ends of respective first and second cantilever beams during the linear portion of each sine wave oscillation.

27 Claims, 7 Drawing Sheets

LASER BEAM SCANNER WITH LOW COST DITHERER MECHANISM

BACKGROUND OF THE INVENTION

1. Field of the Invention

The field of the invention relates to bar code reading at point of sale (POS) locations. In particular the field of the present invention relates to a low-cost laser scanning technique using resonant cantilever beam deflectors for multiplexing scanning and collecting light beams. The invention makes possible a laser scanner which is small, compact, and efficient.

2. The Prior Art

In conventional applications the scanner is mounted in the counter of the POS station. The clerk moves the labeled goods over the window of the scanner and a laser beam within the scanner continuously scans a volume in space above the window. The checker or salesperson moves the package through this space with the label facing the window. When a laser beam crosses the black and White bars, the intensity variations in the scattered light are detected by a photodetector within the scanner. These are then converted to electrical signals which are decoded into the information on the label.

3. BACKGROUND OF THE INVENTION

Normally the scanning is accomplished using a motor which drives a rotor on which are mounted a number of mirrors. Such scanners are described in U.S. Pat. Nos. 4,064,390, 4,699,447, 4,799,164 and many others.

A further method of scanning uses a rotating hologram as in U.S. Pat. Nos. 4,795,224 and 4,647,143. This family of scanners also uses motors and requires considerable space for the hologram and the motor.

Alternatively, bar code labels are scanned using a handheld scanner in POS stations. This type of scanner may use a small mirrored polygon like the in-counter scanners, or it may use other techniques to scan the laser beam. One method uses a galvanometer driven mirror to scan the beam in a single line.

Another conventional technique uses a stepper motor to rotate the mirror back and forth. The advantage of this is that there is less dead time compared to a polygon scanner and to a sinusoidal galvanometer scanner. In addition, less space is required. Such a scanner is described in U.S. Pat. No. 4,825,057. Another disadvantage of the reversing stepper motor design is that a significant time delay is required to stop and start the mirror. In addition, this design generally uses more power than other motor designs.

Resonant mechanical scanners have been introduced in an attempt to overcome the disadvantages inherent in motor driven scanners. Resonant mechanical scanners are employed in a wide variety of applications. They are used because of their high reliability, long life and low-power consumption. Sinusoidally oscillated mechanical scanners have minimum energization requirements and are mechanically and electronically simple in design, fabrication and operation.

Resonant mirror systems for scanning laser beams in bar code reading are well known in the industry. An improved low profile scanner is described in U.S. Pat. No. 4,732,440. The main disadvantage of conventional resonant scanners is that the beam scan is sinusoidal, resulting in a velocity variation which goes from zero to some maximum. This variation is a serious problem for scanning labels because the scan pattern is unusable during the period of low velocity. U.S. Pat. No. 4,859,846 describes a dual-mode resonant scanning system designed to reduce the velocity variation by making the oscillation triangular through the addition of a third harmonic resonance. However, this method also is not well adapted to scanning the parallel, perpendicular bars of the standard bar code label.

SUMMARY OF THE INVENTION

In order to overcome the aforementioned disadvantages of conventional resonant mechanical scanners, the present invention uses a still different method of scanning that incorporates at least a pair of cantilever beams resonating at a predetermined frequency to multiplex, that is, to alternately produce two or more scanning and collecting light beams from at least one focused beam wherein the scan lines produced are in any of several linear arrangements for optimally scanning and decoding a bar code label.

A first aspect of the present device solves the velocity variation problem in conventional resonant mechanical scanners by using the translational motion of a mirror on a resonant cantilever beam to switch the laser beam between at least two resonant systems which are substantially equally out of phase with each other such that the scanned spot velocity never approaches zero but remains relatively high. Since at least two mirror systems are employed, the direction of the multiple scanners may be chosen to be different, thus allowing more design flexibility.

A further aspect of the present invention is its small compact size which allows the scanner to be very thin in the height dimension. In conventional scanner applications, a hole must be cut in the counter for the scanner window, and once it is installed, it is difficult to move the scanner. An alternative provided by this aspect of the invention is a scanner thin enough to lie on top of the counter without noticeably increasing the overall height of the counter. The scanner housing is durable enough to withstand the environment created by moving items across the counter. The scanner can also be moved and relocated easily. The scanner housing can be taped or glued to the counter top without damaging the counter, or it may be fastened with screws.

A further benefit of the present device is its low cost. This improved system is mechanically very simple and requires only a few parts, which are inexpensive to manufacture. The resonant scanning drive apparatus also has a greatly increased lifetime in comparison with conventional devices.

A further aspect of the invention achieves the benefits of time-efficient scanning and linearity by multiplexing two oscillating laser diodes. This is accomplished by affixing separate laser diodes instead of mirrors to the ends of two or more oscillating resonant mechanical scanners. The laser diodes themselves are each mounted with their focusing optics on the end of separate oscillating cantilever beams. The oscillating cantilever beams oscillate generally equally out of phase with each other. Each laser switches on one at a time during the most linear part of its motion and is switched off towards the end of the oscillation when the velocity is still substantial or at least non-zero. This arrangement is very small and compact and can fit in a low profile housing for counter top installation.

BRIEF DESCRIPTION OF THE DRAWINGS

FIG. 3 is a perspective view showing several examples of different scan patterns that can be generated by a two-mirror system according to the present invention and the mirror-cantilever design required.

DETAILED DESCRIPTION OF THE PREFERRED EMBODIMENT

Referring now to FIG. 1, a laser light source (not shown) includes a beam forming means for producing a focused beam 1. This beam has been focused at the appropriate distance by optics prior to the point of deflection in accordance with techniques which are well known. Mirrors 4 and 10 are disposed on the ends of cantilever beams 6 and 8, respectively, which are oscillating at the same frequency and preferably, substantially 90 degrees out of phase with each other. To achieve a linearity of scan, the deflectors or mirrors 4 and 10 preferably are substantially 90 degrees out of phase.

It will be appreciated that the cantilever beams 6, 8 form a scan generator comprising two resonant mechanical systems which are maintained substantially 90 degrees out of phase with each other. The cantilever beams 6, 8 with the scanning mirrors 4, 10, when oscillating, are capable of producing a sine wave motion and are made active alternately during the substantially linear portion near the peak of each sine wave cycle as will be explained. It is understood that a third or fourth oscillating cantilever beam could be included in similar designs, each oscillating at nearly equal phase spacings relative to a sine wave.

The mirrors 4 and 10 are used to multiplex two scanning and collecting light beams. The scanning mirrors 4 and 10 are synchronized in tandem. The cantilever beam parameters and size of mirrors 4 and 10 are selected so that the scanning light beam 1 is on the first mirror 4 during the most linear portion of its scan, and the deflection of the first mirror 4 is just great enough to allow the scanning beam to transition to the second mirror 10 during the most linear portion of the second mirror's scan. Concurrently, the first mirror 4 slows, stops, reverses direction, and regains speed.

The process is repeated twice each cycle. The collection lens (not shown) is large enough to receive the full aperture of both mirrors at all times in the case of retrodirective collection. While not shown, it is readily understood by persons skilled in the art that an electronic means are provided in accordance with well known techniques for detecting the collected light and processing the signal. Decoding means are also included for decoding the information from the bar code label in accordance with well known techniques.

It will be appreciated that the two cantilever beams 6 and 8 multiplex the beam 1 while forming a 90 degree X pattern of two perpendicular scanned lines. The multiplexing is accomplished by placing deflecting mirror 10 behind the mirror 4. When the first mirror 4 moves to the end of its scan, the beam 1 transitions off the mirror 4 and is deflected by the second mirror 10.

Figure 1A:
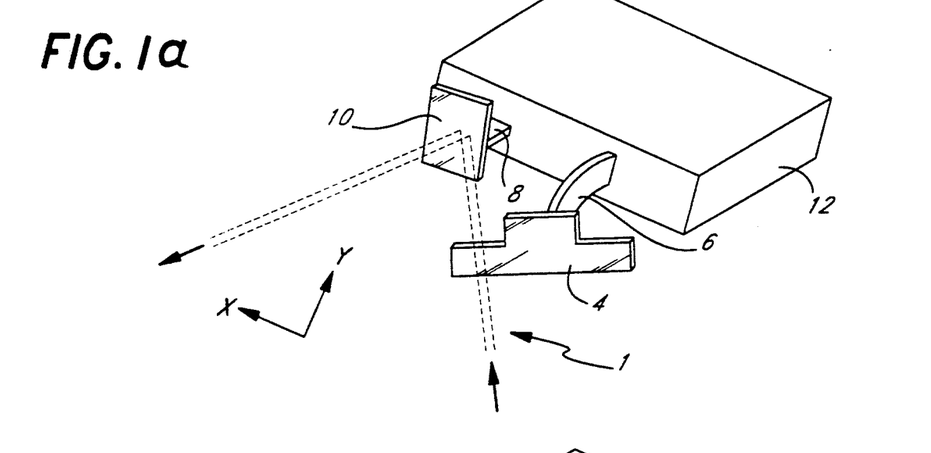
FIG. 1a is a perspective view of two dithering mirrors depicting the incoming beam transitioning from one resonant deflector to the other.
Figure 1B:
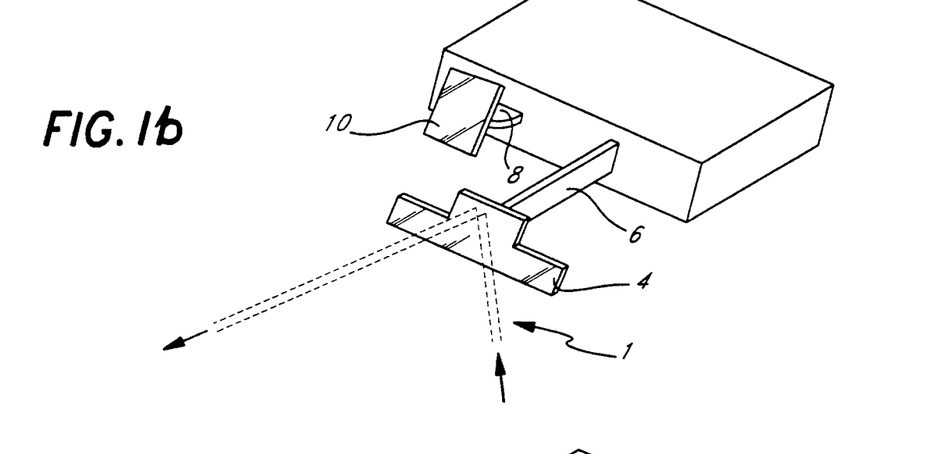
FIG. 1b is a perspective view of two dithering mirrors showing light deflected from a first resonant deflector.

The cantilever beams 6 and 8 are mounted to a carrier 12 which contains a driving means (not shown) for oscillating the cantilever beams 6, 8 at a predetermined frequency, substantially 90 degrees out of phase. As shown in FIG. 1a, the beam 1 is being scanned in the Y direction by mirror 10. Referring now to FIG. 1b, the mirrors 4 and 10 are shown a quarter of a cycle later when the beam 1 is being scanned in the X direction by mirror 4. The motion of the mirror 4 causes the switching or transitioning between the X and Y (horizonal-vertical) directions.

Figure 1C:
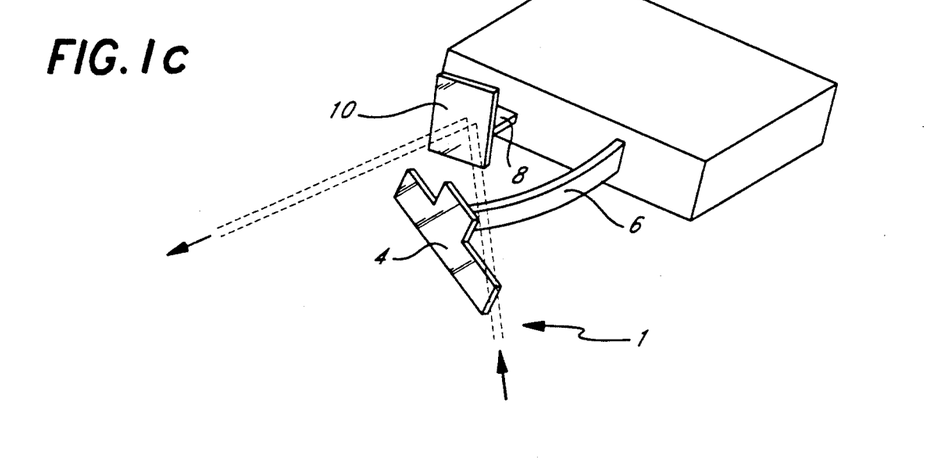
FIG. 1c is a perspective view of two dithering mirrors showing the beam transitioning from a first resonant deflector to another during a second portion of the cycle.

FIG. 1c shows the mirrors 4 and 10 a quarter of a cycle later still. The beam 1 is now being scanned in the Y direction again, but in the opposite direction with respect to FIG. 1a.

An aspect of the present invention enables large deflections and consequently efficient scanning to be achieved by a cantilever beam deflector. This also indirectly allows the beam size at the mirror to be small. For example, the distance to the scan pattern may be small (8 inches or 203.2 mm). Therefore, a desirable Gaussian spot diameter of 0.009 inches (0.23 mm) at the location where the item scanning occurs dictates a scanning-beam size of only 0.080 inches (2.03 mm) at each oscillating mirror. This small spot size to mirror size allows efficient multiplexing which also provides a good collection of light and solid angle in the case of retrodirective collection.

In accordance with one aspect of the invention, reliability is enhanced by extending the fatigue limits of the parts. Assuming that a cantilever beam 6, 8 is bending at 20 Hz throughout its lifetime, in order to reduce the peak stress, the beams 6, 8 are tapered to have a cross-section which is a linear function of distance. This condition ensures that the cantilever beam 6, 8 is always the arc of a circle and has the same stress everywhere along the beam. In order to achieve a desired ±14 degrees of scan and 0.25 (6.35 mm) inches of displacement, the radius of a fully bent beam at each end of its oscillation is about 8 inches 203.2 mm. From the beam-stress relation, the maximum stress in the beam is given by the following equation.

$$\sigma = \frac{Et}{2R}$$

Where, $\sigma$ = PSI
$E$ = Mod. of Elasticity in PSI
$t$ = Beam Thickness
$R$ = Bend Radius Preferably this is about 9,000 PSI for the deflectors built.

At the low value of stress (9,000 PSI) in the beams 6, 8, the system according to the present invention should have a substantially unlimited device lifetime.

Note that the forces acting on the mirror assemblies 4, 10 are relatively small since the maximum acceleration is only 10 g at turnaround. Preferably, the cantilever beams 6, 8 are made of a thin metal whose thickness and characteristics are chosen for low mechanical loss and low metal fatigue. For example, a thin beam of drawn 1.2 C steel with a stress less than 9,000 PSI is predicted to last over 100 million cycles.

Figure 2A:
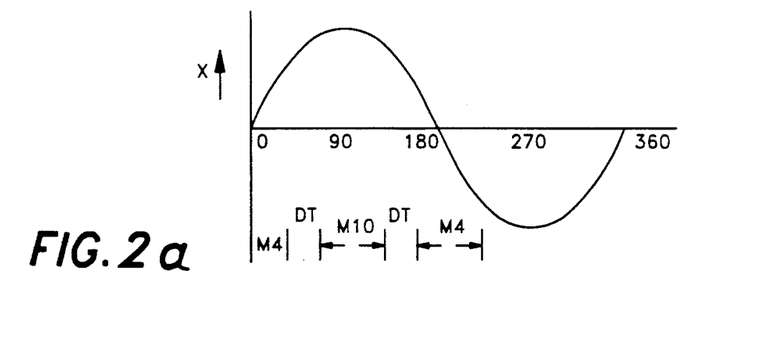
FIG. 2a shows the motion in the x-axis of the end of mirror 4 of FIGS. 1a, 1b and 1c including the dead time for switching and the scan times.
Figure 2B:
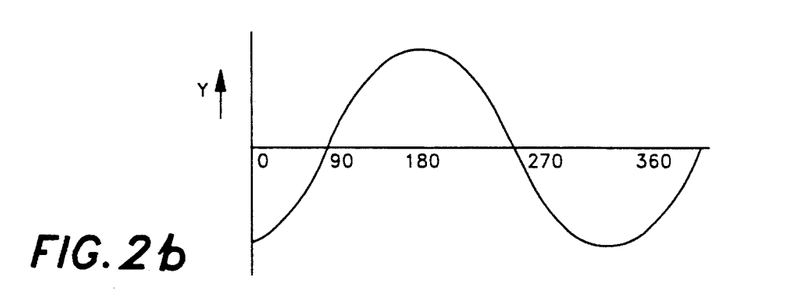
FIG. 2b shows the motion in the y-axis of the end of mirror 10 in FIGS. 1a, 1b and 1c including the dead time for switching and the scan times.

The details of the switching or transitioning of the incoming beam between two oscillating mirrors can be better described from FIGS. 2a and 2b which show the motion of each mirror in its appropriate scan direction as a function of phase angle of the driving frequency. The position of the mirrors in FIGS. 1a, 1b, and 1c corresponds to the phase angles of 0, 90 and 180 degrees, respectively. The notation DT indicates the dead time in the scan when part of the beam is on each mirror during transition from one mirror to the other. The dead time can be calculated using FIGS. 2a and 2b, the size of the mirror and the beam diameter. The on-time of the scanning laser beam is indicated by the M4 and M10 designations.

Figure 3A:
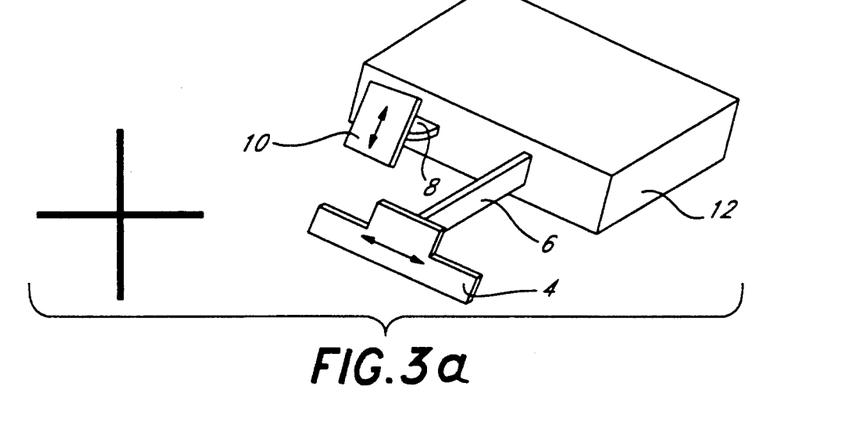
FIG. 3a is a perspective view of a two-mirror system wherein one mirror oscillates in the x-axis and the other mirror oscillates in the y-axis.
Figure 3B:
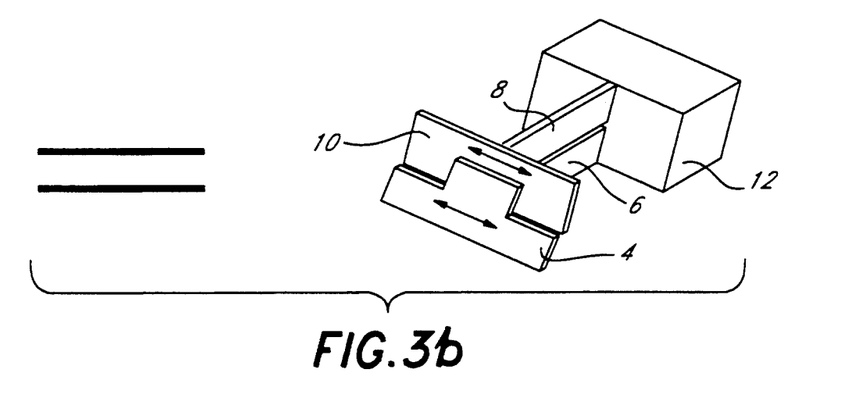
FIG. 3b is a perspective view of a two-mirror system wherein both mirrors oscillate in the x-axis.
Figure 3C:
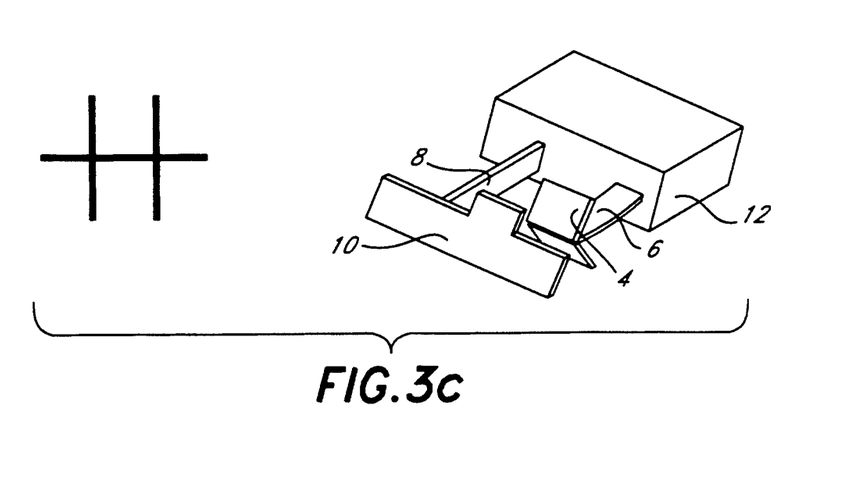
FIG. 3c is a perspective view of a two-mirror system wherein one mirror oscillates in the x-axis and another two faceted mirror oscillates in the y-axis.
Figure 3D:
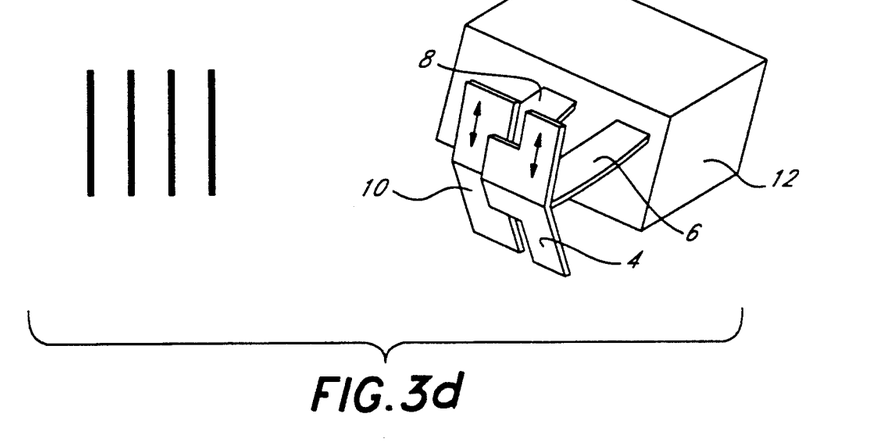
FIG. 3d is a perspective view of a two-mirror system wherein both mirrors oscillate in the y-axis and both mirrors have two facets.
Figure 3E:
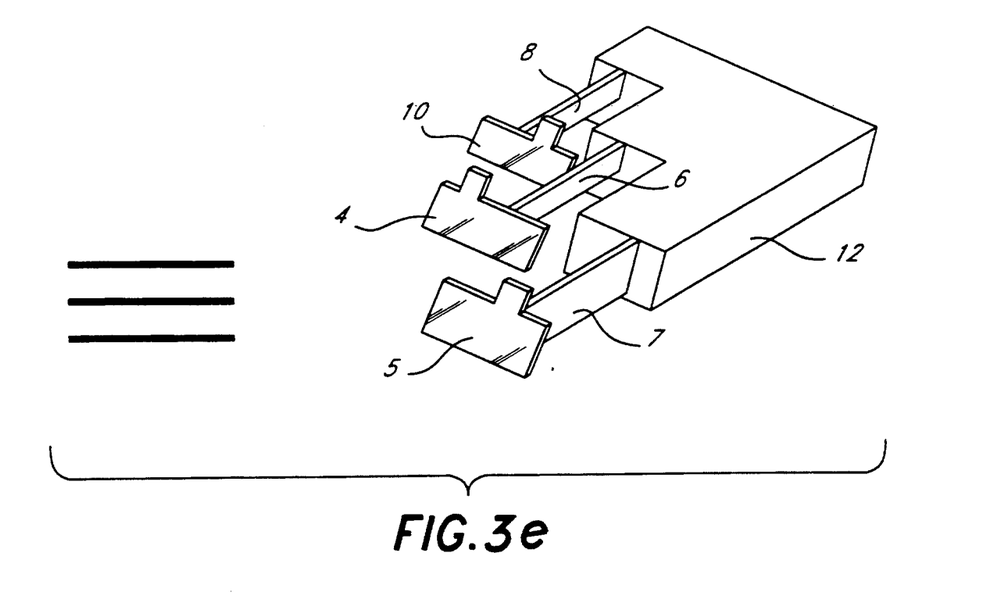
FIG. 3e is a perspective view of a three-mirror system wherein all three mirrors oscillate in the x-axis.

FIGS. 3a through 3d show several two-mirror arrangements and the scan pattern produced by each arrangement. FIG. 3(e) shows a substantially adjacent three-mirror arrangement and the scan pattern generated with third cantilever beam 5 and third mirror 7. The axis of the deflection of cantilever beams determines the direction of the scan line while the mirror orientations determine where the line begins. Persons skilled in the art will be able to use the design rules exemplified in FIGS. 3a through 3e to devise other scan patterns. The fundamental pattern can be further modified by using pattern mirrors to intercept portions of the scan lines. These portions of scan lines are redirected forming other scan lines.

Figure 4:
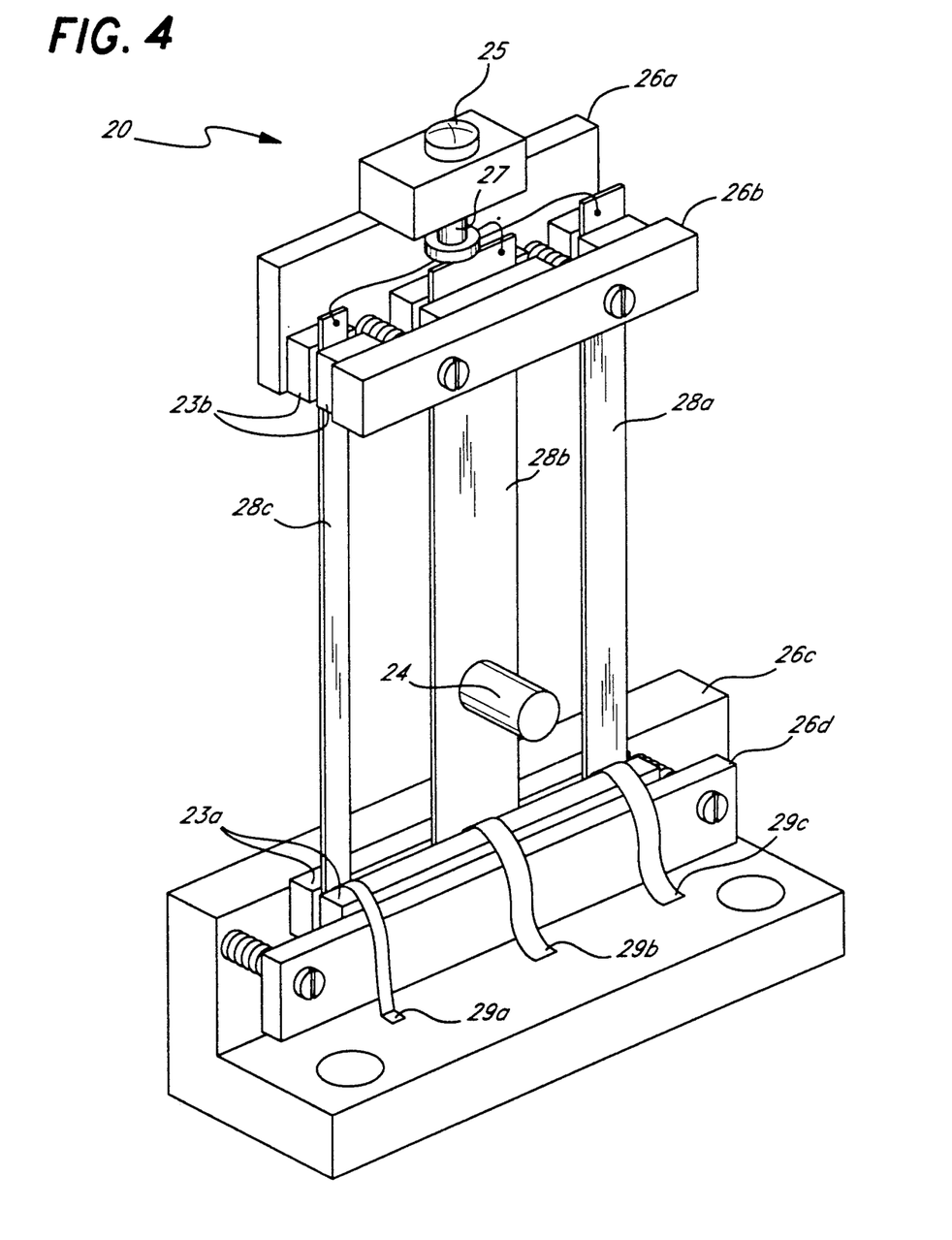
FIG. 4 is a perspective view showing the detail construction of a laser diode with appropriate optics mounted on an oscillating cantilever beam.

FIG. 4 shows a scanning laser subsystem 20 consisting of a laser diode 27 mounted on oscillating cantilever beams 28a, 28b, and 28c. The diode is electrically energized by current flowing through the cantilever beams 28a, 28b. Each cantilever beam 28a, 28b is electrically isolated by glass plates or similar rigid insulating plates 23a and 23b. These plates provide the rigid support required to achieve the high Q mechanical resonance needed to minimize the electrical energy required. The three leads 29a, 29b, 29c are provided for powering the diode and monitoring the output laser power as required to maintain constant power through the temperature range and lifetime of the diode. The upper housing 26a and 26b clamp the rigid insulating plates and cantilever parts together while holding the diode laser 27 and the focusing lens assembly 25. The lens is positioned in front of the diode to produce the spot size appropriate to the scanning requirements of the scanner. The permanent magnet 24 is used to drive the cantilever as described above. The clamps 26d and 26c hold the lower part of the glass plates and cantilever beam together. Persons skilled in the art will be able to find other methods of making contact with the diode and mechanically mounting the optical and electrical components.

Figure 5:
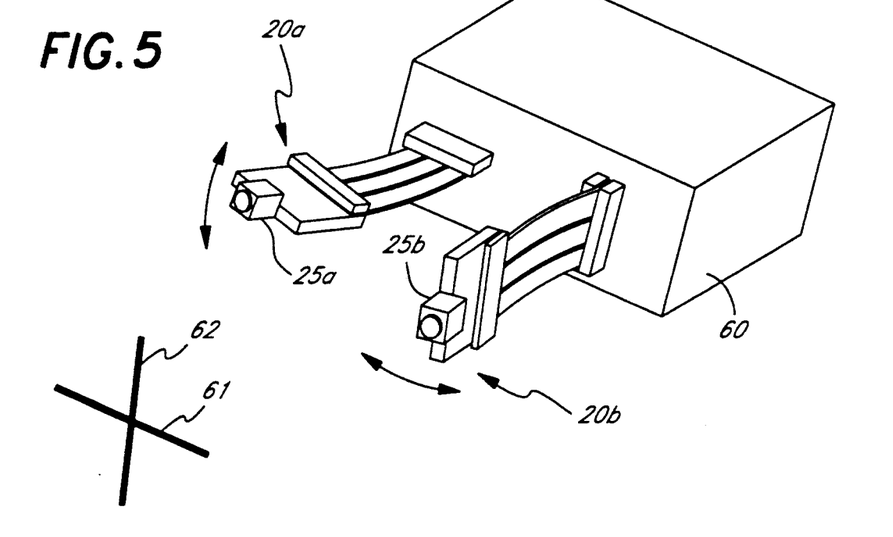
FIG. 5 is a perspective view showing a scanner consisting of two focused laser diodes mounted on two oscillating cantilever beams and the pattern generated.

FIG. 5 shows two oscillating systems each with a laser diode 25a, 25b for producing time efficient scanning. The assemblies 20a, 20b, are mounted orthogonally to the base 60 so as to produce the orthogonal scan lines 61 and 62. The mounting details and leads for driving the laser diodes 25a, 25b are shown in FIG. 4. The velocity of the scanned lines is sinusoidal with the two velocities being substantially 90 degrees out of phase. The power to the diodes 25a, 25b is switched twice per cycle in accordance with well known techniques so as to take advantage of the most linear portion of the sine wave. Each diode 25a, 25b is switched on from 0 to 45 degrees and from 135 degrees to 225 degrees and from 315 back to 360 or 0 degrees. During the off cycle, one diode 25a, or the other 25b, is on.

Figure 6A:
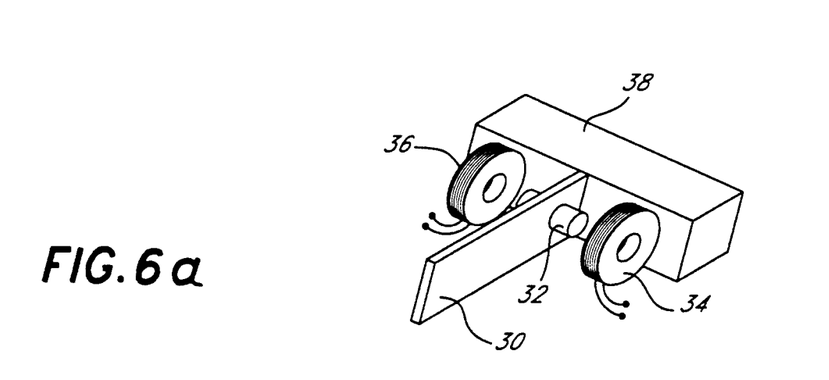
FIG. 6a is a perspective view showing a magnetic method of mechanically driving the cantilever beams.

FIG. 6a shows one type of drive means for oscillating the cantilever beams at the desired resonant frequency. A permanent magnet 32 is mounted on a cantilever beam 30 which is fastened to the support 38. The magnet is attracted or repelled by coil 34 depending on the direction of the current. When the current through the coil 34 is alternating at or near the resonant frequency of the cantilever beam, a large oscillation results with a small amount of electrical power. A voltage is induced in coil 36 by the motion of the magnet. This voltage can be used to limit the drive to the driving coil 34 to maintain the desired amplitude of oscillation. One skilled in the now mature art of electromagnetics will be able to devise many alternate means for driving the cantilever beam. Such methods could use permeable steel parts including a beam without a permanent magnet.

Figure 6B:
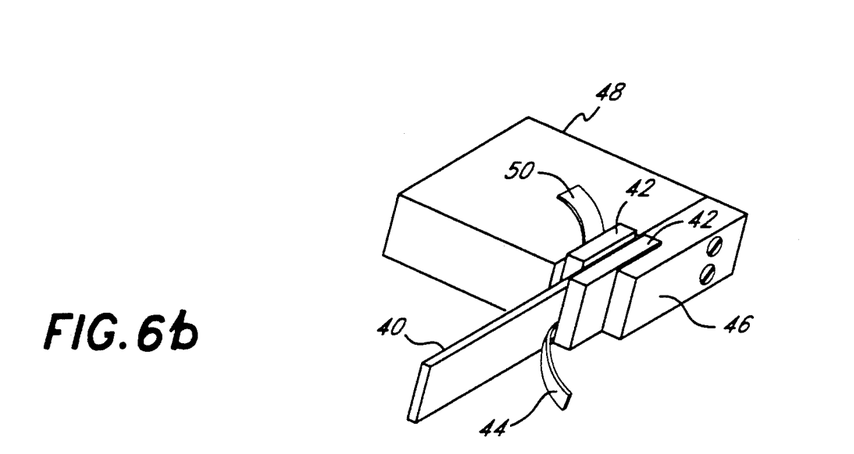
FIG. 6b is a perspective view showing a piezoelectric method of mechanically driving the cantilever beams.

FIG. 6b shows a beam of Bi-morph piezoelectric material 40 which can be excited by voltage applied to the clamped faces. Such material is manufactured by Piezo Electric Products of New Jersey. The frame 48 holds the beam with the aid of the clamp 46. The electrical contact is made through the foil contacts 44 and 50 which are clamped between rigid insulating plates 42 and the beam material 40. When ac voltage at or near the resonant frequency is applied to the piezoelectric material, the beam will oscillate. The oscillation will build up until the power being applied is equal to the mechanical loss in the system. The amplitude of the oscillation can be monitored by an additional electrode on the beam which feeds back the degree of oscillation to the drive circuitry. The oscillation could also be limited by a mechanical stop which prevents the beam from moving more than a fixed amount.

Figure 7A:
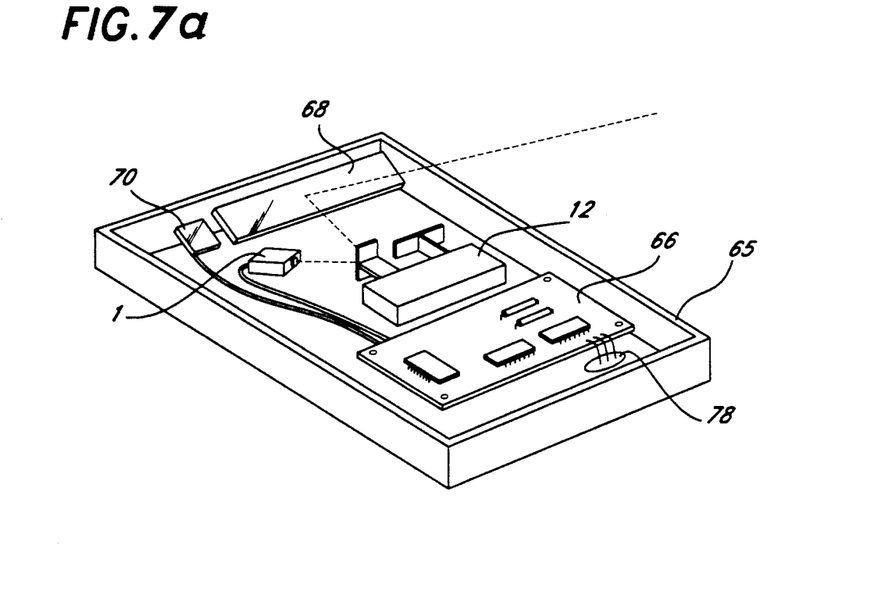
FIG. 7a is a perspective view of the low profile housing configuration with the major components identified.

FIG. 7a shows the low profile scanner with the cover 72 removed. In this embodiment the laser 1 projects a beam to the multiplexing scanners 12. The scanned laser beams strike mirror 68 before leaving the housing 65. The reflected light from the label is detected by the photodetector 70 and converted to an electrical signal which is sent to the circuit board 66. The circuit board has the electronic circuit means for powering the laser diode, for amplifying the return signal, for decoding the label and for transmitting the data in the needed format to the next station. The foregoing circuit means are well known in the art of bar code scanners. The circuit board also includes circuit means for driving the beam deflectors at an appropriate resonant frequency as previously described.

Figure 7B:
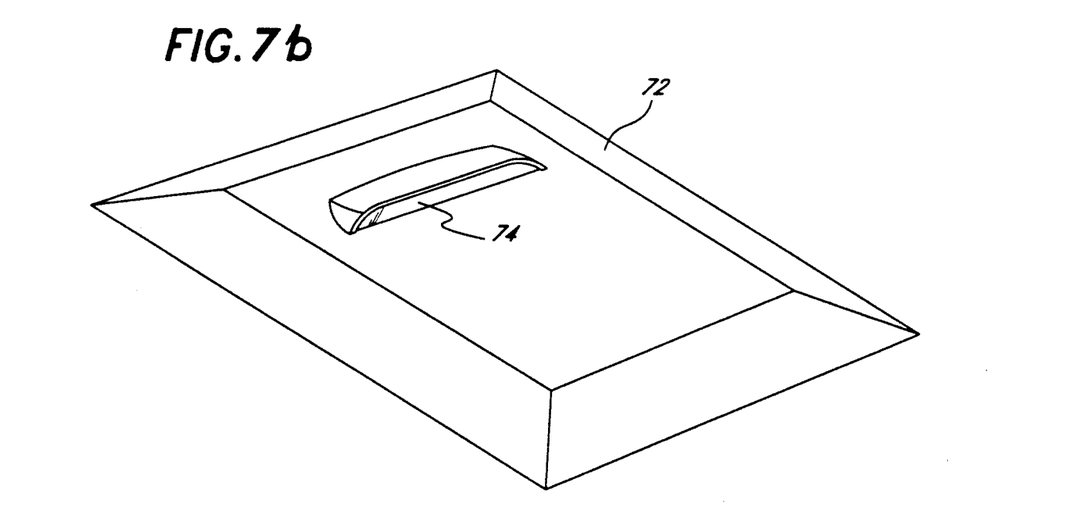
FIG. 7b is a perspective of the exterior of the low profile scanning system according to the present invention.

The cover 72 of the housing is shown in FIG. 7b. The window 74 is facing the direction of the approaching goods and is large enough to accommodate the scanning beams and the photo-detector 70. Although this configuration is believed to be optimally dimensioned, one skilled in the art will be able to reconfigure the building block to achieve the same goals. For example, retro-directive collection of the light can be used in place of the direct collection in FIG. 7a.

Figure 8A:
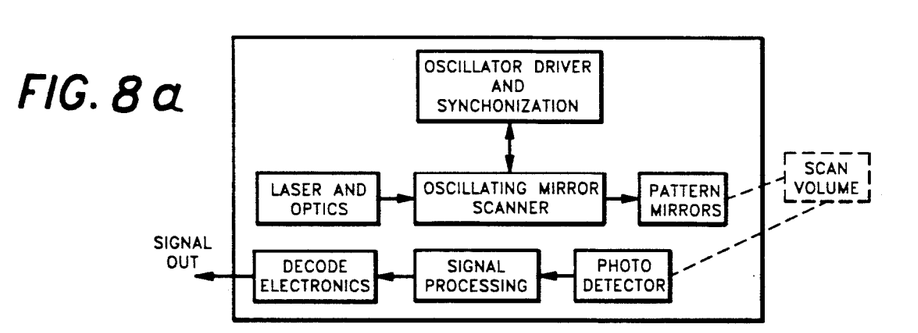
FIG. 8a shows a block diagram of the cantilever resonant scanning system according to the present invention with mirrors disposed on the resonant cantilever beams.

The block diagram of FIG. 8a shows the general operation of the bar code reader. The light beam from the laser and optics is reflected by the oscillating mirror scanner producing scan lines in the scan directions. The lines may be further routed by the pattern mirror or mirrors before exiting the housing. A label in the scan volume scatters light, some of which reaches the photodetector. After signal processing the electrical signal is decoded and sent to where the data is further processed.

Figure 8B:
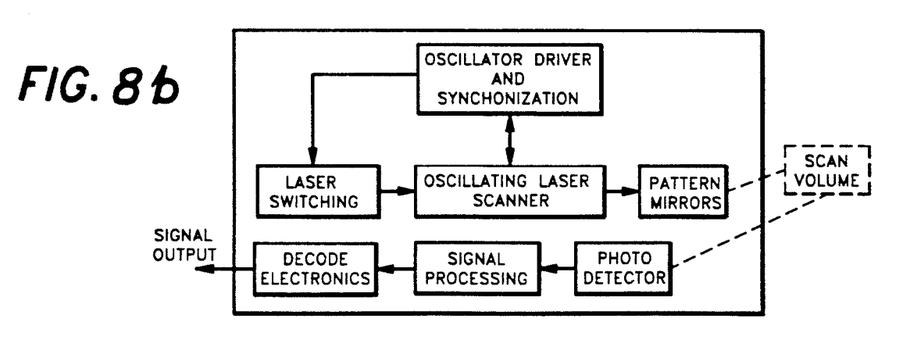
FIG. 8b shows a block diagram of the cantilever resonant scanning system according to the present invention with laser diodes disposed on the resonant cantilever beams.

The block diagram of FIG. 8b shows the general operation of an alternate embodiment of a bar code reader constructed in accordance with the present invention. The bar code reader in FIG. 8b functions the same way as the block diagram in 8a except there are two lasers which are switched on and off in synchronization with the drive signal as described above.

Thus, an improved ditherer device is described which employs resonant cantilever beams with mirrors to multiplex two scanning and collecting light beams. This makes possible a low cost, POS scanner having a minimal height dimension which is readily adaptable for surface mounting on a counter or other surface at a POS location.

While the present device has been described in connection with what is presently considered to be the most practical and preferred embodiments, it is to be understood that the device is not limited to the disclosed embodiments but, on the contrary, is intended to cover various modifications and equivalent arrangements included within the spirit and scope of the appended claims. For example, three or four or more resonant cantilever beams may be employed, each having a scanning mirror disposed on the oscillating end of each respective cantilever beam. Each beam oscillates sequentially at a resonant frequency and generally equally out of phase with respect to an adjacent beam. In this regard, three or more scanning mirrors could be used to multiplex a plurality of scan lines from a single focused beam. Similarly, three or more diodes may be disposed on the ends of three or more resonant cantilever beams, respectively. A controller would sequentially enable the diodes disposed on the ends of the respective cantilever beams during the linear portion of each sine wave oscillation of the beams.

Therefore, persons of ordinary skill in this field are to understand that all such equivalent structures are to be included within the scope of the following claims.

What is claimed is:

1. A bar code scanner for scanning a bar code comprising:
   at least one laser light source including a beam forming means for producing a focused laser beam;
   a scan generator means comprising first and second resonant mechanical systems oscillating in a sine wave at substantially 90 degrees out of phase with each other, said first and second resonant mechanical systems being alternately activated for scanning during the substantially linear portion of said sine wave oscillation;
   collection means for collecting light reflected from said bar code being scanned;
   electronic detection means responsive to said collected light for processing and decoding information from said collected light.

2. A bar code scanner according to claim 1 wherein said first and second resonant mechanical systems comprise first and second resonant cantilever beams each having a first end supported in a base and a free end for oscillating, and wherein said at least one laser light source further comprises a laser diode and corresponding focusing optics disposed on the oscillating free end of each of said first and second resonant cantilever beams.

3. A bar code scanner according to claim 2 wherein said first and second cantilever beams are comprised of thin metal sheets which are electromagnetically excited to a desired resonant frequency.

4. A bar code scanner according to claim 2 wherein said first and second cantilever beams are each comprised of a piezoelectric material having a first end clamped for receiving an applied voltage and a second end free for oscillation in response to said applied voltage.

5. A bar code scanner according to claim 1 wherein said first and second resonant mechanical systems comprise first and second resonant cantilever beams each having a first end supported in a base and a free end for oscillating and said scan generator means further comprises first and second mirrors, each mounted on a corresponding oscillating end of said first and second cantilever beams for scanning said focused laser beam and wherein said alternate activation is accomplished by said first mirror means oscillating so as to move out of alignment with said focused laser beam, enabling said focused laser beam to then strike said second mirror means.

6. A bar code scanner according to claim 1 further including a housing for containing said bar code scanner, wherein said housing is characterized by having a height dimension which is a small fraction of its transverse dimensions, said height dimension being less than 1 inch.

7. A resonant mechanical bar code scanning system for multiplexing at least two scanning beams from a beam of focused laser light and for collecting reflected light from a bar code comprising:

first and second cantilever beams comprised of bimorphous piezoelectric material each having an end fixed in a supporting base and a free end for oscillation;

first and second mirror means each attached to a corresponding free end of one of said first and second cantilever beams for scanning said focused laser light to a bar code and for collecting light reflected from said bar code;

control means for alternately applying an ac voltage at or near resonant frequency to said first and second cantilever beams to cause said first and second mirror means to resonantly deflect substantially 90 degrees out of phase with one another such that the resonant deflection of said first mirror means is just sufficient to enable said focused laser light to strike said second mirror means during the linear portion of the second mirror's oscillation;

a collection lens to receive the full aperture of both said first and second mirror means for collecting reflected light;

decoder means responsive to said collected light and for producing an output signal representative of the information derived from said collected light.

8. A resonant mechanical scanning system according to claim 7 wherein said control means further includes limiting means for maintaining a desired amplitude of oscillation and for providing a feedback signal to said control means representative of said amplitude of oscillation and for limiting said oscillation to a desired frequency.

9. A resonant mechanical scanning system according to claim 8 wherein said limiting means further includes an electrode means mounted on each of said first and second cantilever beams, means for producing said feedback signal representative of said amplitude of oscillation of said first and second cantilever beams and a control circuit means responsive to said feedback signal for limiting the amount of ac voltage applied to said first and second piezoelectric cantilever beams to maintain a predetermined amplitude of oscillation.

10. A resonant mechanical scanning system for multiplexing at least two scanning beams from a beam of focused laser light comprising:

first and second cantilever beams each having a first end fixed in a supporting base and a free end for oscillation;

first and second mirror means each mounted on a respective free end of said first and second cantilever beams for scanning said beam of focused laser light into a plurality of desired scan lines;

first and second coil means mounted to said supporting base in close proximity with said first and second cantilever beams for receiving an ac applied current;

oscillating means, provided in said first and second cantilever beams, magnetically responsive to said ac current applied to said corresponding first and second coil means;

control means for alternately applying said ac current at or near resonant frequency to said first and second coil means for oscillating said first and second cantilever beams in a sine wave 90 degrees out of phase with each other such that said beam of focused laser light is scanned by said first mirror means during the linear portion of its oscillation and the deflection of said first mirror means by reason of said oscillation is sufficient to enable said beam of focused laser light to be scanned by said second mirror means during the linear portion of the second mirror's oscillation;

collection means for collecting light reflected from the scanned beams;

decoder means for decoding information from said reflected light.

11. A resonant mechanical scanning system according to claim 10 wherein said control means further includes circuit feedback means for applying a voltage induced in said first and second coil means by the movement of the first and second cantilever beams to said control means to limit the applied ac current and to maintain a desired amplitude of oscillation.

12. A resonant mechanical scanning system according to claim 10 wherein said oscillating means further comprises corresponding first and second magnet means mounted on said first and second cantilever beams respectively.

13. A resonant mechanical scanning system according to claim 10 wherein said oscillating means further comprises a permeable steel section provided on each of said first and second cantilever beams.

14. A resonant scan generator for multiplexing a scanning beam for scanning a bar code comprising:

first and second cantilever beams, each having a free end for oscillation and an opposite, supporting end fixed in a base, such that the longitudinal axis of deflection of said first cantilever beam is disposed orthogonally with respect to the longitudinal axis of deflection of said second cantilever beam;

first and second mirror means each mounted on the respective oscillating free end of said first and second cantilever beams, for scanning a focused laser beam through a locus of points defining a scan line;

means for oscillating said first and second cantilever beams in a sine wave at a resonant frequency substantially 90 degrees out of phase such that said first and second mirror means are alternately activated for scanning said focused laser beam during the substantially linear portion of said sine wave oscillation;

means for collecting the light reflected from said bar code being scanned;

decoder means including detection means responsive to said collected light for decoding information from said collected light.

15. A resonant scan generator according to claim 14 wherein said first and second cantilever beams each comprise a piezoelectric material, each having a lead for receiving an applied ac voltage at their respective supporting end and oscillating in response to said applied ac voltage at said resonant frequency.

16. A resonant scan generator according to claim 14 further comprising first and second coils for receiving an applied ac voltage are disposed on said base each in proximity to a corresponding one of said first and second cantilever beams along their respective axes of deflection; and wherein said first and second cantilever beams each comprise a permeable steal material magnetically responsive to said ac voltage applied to said first and second coils.

17. A resonant scan generator according to claim 14 wherein multiplexing of said focused laser beam is accomplished by said first mirror means oscillating so as to move out of alignment with said focused laser beam, enabling said second mirror means to then scan said focused laser beam along a predetermined locus of points.

18. A resonant scan generator according to claim 16 wherein said first and second cantilever beams each include a permanent magnet means disposed in proximity with a corresponding one of said first and second coils such that the first and second cantilever beams oscillate in response to said ac voltage applied to said first and second coils.

19. A resonant mechanical scan generator for scanning a bar code label comprising:
   first and second cantilever beams each having a free end for oscillation and an opposite end fixed in a supporting base such that the axis of deflection of said first cantilever beam is disposed orthogonally to the axis of deflection of said second cantilever beam;
   first and second laser diodes including focusing means each disposed on a corresponding free end of said first and second cantilever beams;
   means for oscillating said first and second cantilever beams in a sine wave at a resonant frequency, 90 degrees out of phase with each other;
   control means for alternately activating said first and second laser diodes during a substantially linear portion of said sine wave oscillation.

20. A resonant mechanical scan generator according to claim 19 wherein said control means for alternately activating said first and second laser diodes includes means for switching on said first and second laser diodes from 0° to 45° and from 145° to 225° and from 315° back to 0°.

21. A resonant mechanical scan generator according to claim 19 wherein said first and second cantilever beams comprise bimorphous piezoelectric material and include corresponding first and second leads for applying an ac voltage to the respective supporting ends of said first and second cantilever beams such that said first and second cantilever beams oscillate in said sine wave in response to said ac voltage applied at said resonant frequency.

22. A resonant mechanical scan generator according to claim 19 wherein said first and second cantilever beams include first and second permanent magnets, each magnet disposed on a respective side of a corresponding one of said first and second cantilever beams and in proximity to a corresponding first and second coils for receiving an applied ac voltage such that an ac voltage applied to said first and second coils causes said first and second cantilever beams to oscillate in said sine wave.

23. A bar code scanner for scanning a bar code comprising:
   at least one laser light source for producing a focused laser beam;
   a scan generator means comprising three or more substantially adjacent resonant mechanical systems, each oscillating in a sine wave generally equally out of phase with an adjacent one of said three or more resonant mechanical systems, wherein each of said resonant mechanical systems is sequentially activated for scanning during a substantially linear portion of said sine wave oscillation;
   collection means for collecting the light reflected from a bar code being scanned;
   electronic detection means responsive to said collected light for processing and decoding information from said collected light.

24. A bar code scanner according to claim 23 wherein said three or more resonant mechanical systems comprise:
   three or more substantially adjacent resonant cantilever beams, each having a first end supported in a base and a free end for oscillating, and wherein said at least one laser light source comprises a laser diode and corresponding focusing optics disposed on the oscillating free end of each of said three or more cantilever beams; and
   a controller means for controlling the sequential activation of said laser diodes during the linear portion of said sine wave oscillation of each of said three or more cantilever beams.

25. A bar code scanner according to claim 23 wherein said three or more resonant mechanical systems comprise three or more substantially adjacent resonant cantilever beams, each having a first end supported in a base and a free end for oscillating, and wherein the scan generator means further comprises three or more mirror means, each mounted on an oscillating free end of a corresponding one of said three or more cantilever beams, for scanning said focused laser beam to a bar code, and wherein said sequential activation for scanning is accomplished by each mirror alternately oscillating so as to move out of alignment with said focused laser beam, enabling said focused laser beam to then strike an adjacent mirror means.

26. A method for scanning a bar code comprising the steps of:
   producing a focused laser beam;
   oscillating a plurality of scanning mirrors at a resonant frequency sequentially in a sine wave motion and generally equally out of phase with each other;
   activating each of said plurality of mirrors to sequentially scan said focused beam during the linear portion of each mirror's sine wave oscillation;
   collecting light reflected from the bar code;
   detecting said collected light;
   processing and decoding information from said collected light.

27. A method for scanning a bar code according to claim 26 wherein said step of activating each of said plurality of mirrors sequentially, includes the step of selectively configuring said mirrors such that as a first mirror oscillates out of the linear portion of its motion, it moves out of alignment with said focused laser beam and an adjacent mirror transitions into alignment with said focused laser beam for scanning said bar code.

* * * * *